(12) United States Patent
Knutson et al.

(10) Patent No.: US 11,525,926 B2
(45) Date of Patent: Dec. 13, 2022

(54) SYSTEM AND METHOD FOR POSITION FIX ESTIMATION USING TWO OR MORE ANTENNAS

(71) Applicant: Aptiv Technologies Limited, St. Michael (BB)

(72) Inventors: Eric P. Knutson, Kokomo, IN (US); David M. Spell, Kokomo, IN (US); Linh N. Pham, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 595 days.

(21) Appl. No.: 16/583,902

(22) Filed: Sep. 26, 2019

(65) Prior Publication Data

US 2021/0096266 A1    Apr. 1, 2021

(51) Int. Cl.
| G01S 19/41 | (2010.01) |
| G01S 19/47 | (2010.01) |
| G01S 19/51 | (2010.01) |

(52) U.S. Cl.
CPC .............. *G01S 19/41* (2013.01); *G01S 19/47* (2013.01); *G01S 19/51* (2013.01)

(58) Field of Classification Search
CPC ........... G01S 19/41; G01S 19/47; G01S 19/51
See application file for complete search history.

(56) References Cited

U.S. PATENT DOCUMENTS

| 6,014,101 | A | * | 1/2000 | Loomis ................... G01S 19/41 |
| | | | | 701/472 |
| 7,969,352 | B2 | | 6/2011 | DiLellio et al. |
| 8,044,849 | B2 | | 10/2011 | Ferguson et al. |
| 8,049,667 | B2 | | 11/2011 | Lackey |
| 8,085,196 | B2 | | 12/2011 | Whitehead |
| 8,174,437 | B2 | | 5/2012 | Whitehead |
| 8,195,357 | B2 | | 6/2012 | Basnayake |
| 8,239,133 | B2 | | 8/2012 | Wang et al. |
| 8,244,411 | B2 | | 8/2012 | Baker |

(Continued)

FOREIGN PATENT DOCUMENTS

| CN | 103245963 A | 8/2013 |
| CN | 107132563 A | 9/2017 |
| WO | 2009082745 A1 | 7/2009 |

*Primary Examiner* — Dao L Phan
(74) *Attorney, Agent, or Firm* — Billion & Armitage

(57) ABSTRACT

A dual-antenna positioning system includes a first GNSS antenna/receiver, a second GNSS antenna/receiver, and a GNSS processor system. The first GNSS antenna/receiver is located at a first position and calculates a first pseudo-range based on a received GNSS signal. The second GNSS antenna/receiver is located at a second position a known distance from the first GNSS antenna/receiver, wherein the second GNSS antenna/receiver calculates a second pseudo-range based on a received GNSS signal. The GNSS processor system configured to receive the first pseudo-range and the second pseudo-range, wherein in response to the GNSS processor system identifying one of the first and second pseudo-ranges as erroneous and one of the first and second pseudo-ranges as valid, the GNSS processing system calculates a corrected pseudo-range and utilizes the corrected pseudo-range and the valid pseudo-range to determine GNSS position fix estimates for the first GNSS antenna/receiver and the second GNSS antenna/receiver.

19 Claims, 6 Drawing Sheets

(56) References Cited

U.S. PATENT DOCUMENTS

| | | |
|---|---|---|
| 8,260,552 B2 | 9/2012 | Jeerage et al. |
| 8,412,456 B2 | 4/2013 | Roh |
| 8,447,517 B2 | 5/2013 | Roh |
| 8,686,900 B2 | 4/2014 | Whitehead et al. |
| 8,725,327 B2 | 5/2014 | Shroff |
| 9,778,368 B2 | 10/2017 | Krantz et al. |
| 2009/0121932 A1 | 5/2009 | Whitehead et al. |
| 2010/0156709 A1 | 6/2010 | Zhang et al. |
| 2010/0161179 A1 | 6/2010 | McClure et al. |
| 2016/0033648 A1 | 2/2016 | Overbeck |
| 2016/0313450 A1 | 10/2016 | Jordan et al. |

\* cited by examiner

SYSTEM AND METHOD FOR POSITION FIX ESTIMATION USING TWO OR MORE ANTENNAS

FIELD

This disclosure is directed generally to global navigation satellite systems (GNSS) and, more specifically to systems, devices and methods for generating a GNSS position/orientation using two or more GNSS antennas/receivers.

BACKGROUND

Global navigation satellite systems (GNSSs) refers generally to systems that allow a position fix to be determined based on GNSS signals received from a plurality of GNSS satellites. Each GNSS satellite transmits a GNSS signal that identifies the satellite and the time the signal was transmitted. A GNSS antenna/receiver is configured to receive each of the GNSS signals transmitted by the visible GNSS satellites and utilize the time-of-flight of each GNSS signal along with known position of each GNSS satellite to determine a pseudo-range or distance from the GNSS antenna/receiver to the respective GNSS satellite. The plurality of calculated pseudo-ranges are utilized to trilaterate a position of the GNSS antenna/receiver in three-dimensional space. Types of GNSS systems include Global Positioning System (GPS), GLONASS, Galileo, BeiDou, and others.

GNSSs are typically extremely accurate. However, urban environments defined by the presence of tall buildings—sometimes referred to as urban canyons—present a particular challenge to GNSS receivers. Not only do the buildings block at least some of the GNSS signals—reducing the number of signals available to make a position fix estimate—but some of the signals that reach the GNSS receiver are received as a result of one or more reflections from the buildings. The increase in time-of-flight associated with reflected GNSS signals leads to erroneous pseudo-range estimates and therefore erroneous GNSS position fix estimates.

SUMMARY

According to one aspect, a dual-antenna positioning system includes a first global navigation satellite system (GNSS) antenna/receiver, a second GNSS antenna/receiver, and a GNSS processor system. The first GNSS antenna/receiver is located at a first position and calculates a first pseudo-range based on a received GNSS signal. The second GNSS antenna/receiver is located at a second position a known distance from the first GNSS antenna/receiver, wherein the second GNSS antenna/receiver calculates a second pseudo-range based on a received GNSS signal. The GNSS processor system configured to receive the first pseudo-range and the second pseudo-range, wherein in response to the GNSS processor system identifying one of the first and second pseudo-ranges as erroneous and one of the first and second pseudo-ranges as valid, the GNSS processing system calculates a corrected pseudo-range and utilizes the corrected pseudo-range and the valid pseudo-range to determine GNSS position fix estimates for the first GNSS antenna/receiver and the second GNSS antenna/receiver.

According to another aspect, a method of determining a global navigation satellite system (GNSS) position fix estimate includes receiving a first pseudo-range from a first GNSS antenna/receiver and receiving a second pseudo-range from a second GNSS antenna/receiver located a known distance from the first GNSS antenna/receiver. The method further includes determining that the first pseudo-range is erroneous and determining that the second pseudo-range is valid. A corrected first pseudo-range is calculated based on the second pseudo-range, the known distance between the first GNSS antenna/receiver and the second GNSS antenna/receiver, and angle-of-arrival (AoA) of a GNSS signal received at the second GNSS antenna/receiver. A GNSS position fix estimate is calculated for the first GNSS antenna/receiver based, at least in part, on the corrected first pseudo-range.

According to another aspect, a global-navigation satellite system (GNSS) is configured to receive GNSS data from a first GNSS antenna/receiver and a second GNSS antenna/receiver and to provide in response a GNSS position/orientation estimate for the first GNSS antenna/receiver and the second GNSS antenna/receiver. The GNSS includes a processor and a computer readable medium that stores instructions that, when executed by the processor, perform a method to a calculate the GNSS position fix estimate. The method includes identifying a first pseudo-range associated with the first GNSS antenna/receiver as erroneous and identifying a second pseudo-range associated with the second GNSS antenna/receiver as valid. The method further includes calculating a corrected first pseudo-range based on the second pseudo-range, the known distance between the first GNSS antenna/receiver and the second GNSS antenna/receiver and angle-of-arrival (AoA) of the GNSS signal received at the second GNSS antenna/receiver. A GNSS position fix estimate is calculated for the first GNSS antenna/receiver based, at least in part, on the corrected first pseudo-range.

DETAILED DESCRIPTION

A typical global navigation satellite system (GNSS) includes a plurality of GNSS satellites each transmitting individual GNSS signals carrying detailed time-of-flight information. GNSS antenna/receivers are configured to receive the GNSS signals and determine from the time-of-flight information provided the distance (referred to herein as a pseudo-range) from the GNSS antenna/receiver to the GNSS satellite. GNSS signals that are unobstructed are referred to as line-of-sight (LOS), while those that are obstructed are referred to as non line-of-sight (NLOS) or reflected signals. The distance traveled by reflected GNSS signals increases the time-of-flight of these signals, which erroneously increases the pseudo-range calculated by the GNSS antenna/receiver. As a result of the erroneous pseudo-ranges the accuracy of GNSS position/orientation fix estimates are degraded.

The present disclosure is directed to GNSS system utilizing two or more GNSS antenna/receivers. During operation, it is likely that one of the GNSS antenna/receivers will receive LOS GNSS signals from a GNSS satellite, while the other GNSS antenna/receiver receives a reflected GNSS signal resulting in an erroneous pseudo-range. The GNSS system described herein provides a system and method of correcting the erroneous pseudo-range and utilizing the corrected pseudo-range to generate a more accurate GNSS position/orientation fix estimates.

Figure 1A:
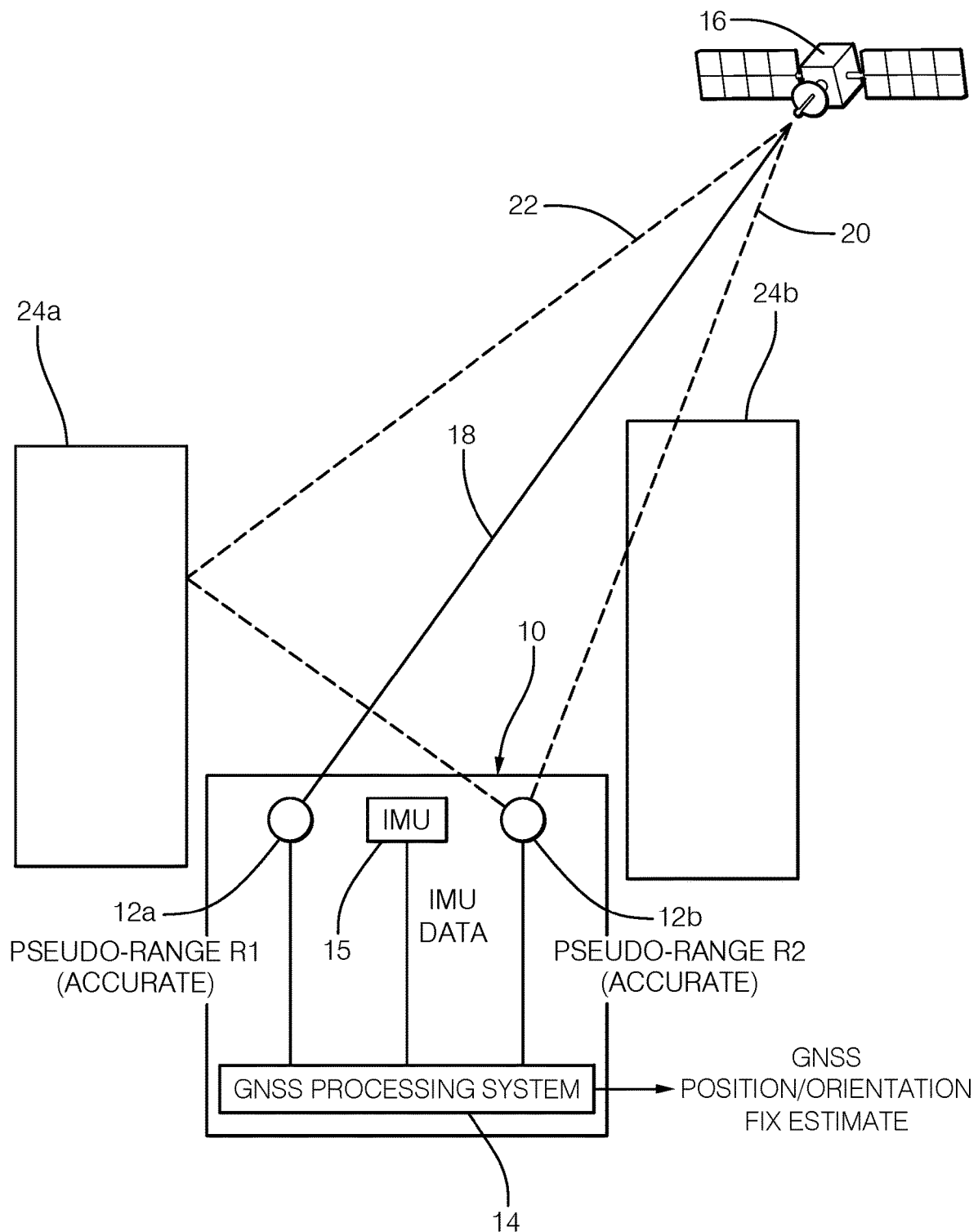
FIG. 1a is a block diagram of a dual antenna position estimate system according to some embodiments.
Figure 1B:
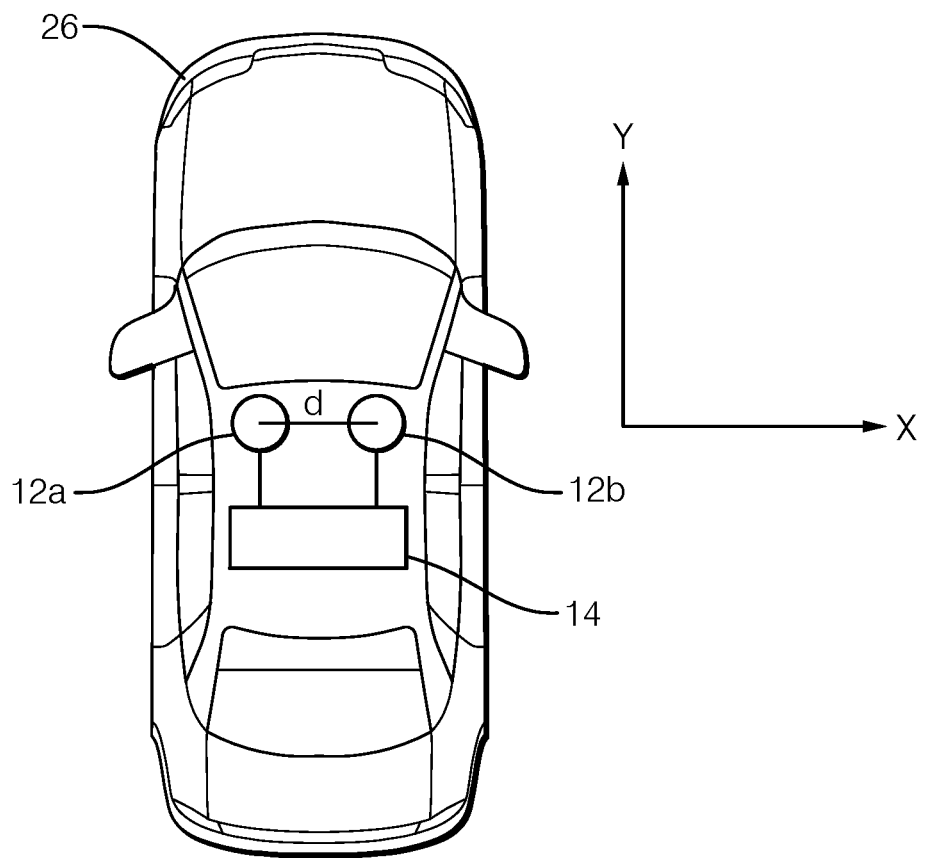
FIG. 1b is a top view of a vehicle having first and second antennas installed according to some embodiments.

Referring to FIGS. 1a and 1b, a dual antenna position estimate system 10 is provided that generates GNSS position/orientation fix estimates based on received GNSS signals. In particular, FIG. 1a is a block diagram illustrating a dual antenna position estimate system 10 in which a first GNSS antenna/receiver 12a receive a LOS GNSS signal and a second GNSS antenna/receiver 12b receives a reflected or NLOS GNSS signal and FIG. 1b is a top view of a vehicle utilizing a dual-antenna position estimate system 10 in which the first GNSS antenna/receiver 12a and second GNSS antenna/receiver 12b are located are known positions relative to one another.

In some embodiments, the dual antenna position estimate system 10 includes at least a first GNSS antenna/receiver 12a and a second GNSS antenna/receiver 12b and a GNSS processing system 14. In some embodiments, position estimate system 10 further includes an inertial measurement unit (IMU) 15 located on the vehicle or system that includes the first and second GNSS antenna/receivers 12a, 12b. In some embodiments, the IMU 15 includes one or more accelerometers, gyroscopes and/or magnetometers to measure acceleration, rotation and/or heading experienced by the IMU 15. For example, in some embodiments, the IMU 15 would include a plurality of accelerometers, gyroscopes, and/or magnetometers to measure movement in three axes of movement (e.g., one for each axis of movement, pitch, roll and yaw). A GNSS satellite 16 transmits GNSS signals received by the first and second GNSS antenna/receivers 12a, 12b. In the example shown in FIG. 1a, the first GNSS antenna/receiver 12a is LOS with respect to GNSS satellite 16, as indicated by solid line 18 connecting GNSS satellite 16 and GNSS antenna/receiver 12a. The first GNSS antenna/receiver 12a utilizes the time-of-flight information associated with the LOS GNSS signal 18 to calculate a first pseudo-range R1, which is representative of the distance between the first GNSS antenna/receiver 12a and GNSS satellite 16. The first pseudo-range R1 is provided as an input to GNSS processing system 14.

In the example shown in FIG. 1a, the second GNSS antenna/receiver 12b is NLOS with respect to GNSS satellite 16 as illustrated by GNSS signal 20 being blocked by the presence of building 24b. However, the second GNSS antenna/receiver 12b receives a reflected GNSS signal 22 from the GNSS satellite 16. The second GNSS antenna/receiver 12b utilizes the time-of-flight information associated with the reflected GNSS signal 22 to calculate a second pseudo-range R2. However, because the GNSS signal received by the second GNSS antenna/receiver 12b is a reflection from building 24a, the calculated pseudo-range R2 is representative of the flight path of the reflected signal and not the distance between the second GNSS antenna/receiver 12b and the GNSS satellite 16. The second pseudo-range R2—although erroneous—is similarly provided as an input to the GNSS processing system 14.

Although only a single GNSS satellite is illustrated in FIG. 1a, each GNSS antenna/receivers receives GNSS signals from a plurality of GNSS satellites, and pseudo-ranges generated with respect to each received GNSS signal is provided to GNSS processing system 14. GNSS processing system 14 utilizes the plurality of pseudo-ranges (including, for example, pseudo-range R1) provided by GNSS antenna/receiver 12a to determine a GNSS position fix estimate of the first GNSS antenna/receiver 12a. Likewise, GNSS processing system 14 utilizes the plurality of pseudo-ranges (including, for example, pseudo-range R2) provided by GNSS antenna/receiver 12b to generate a GNSS position fix estimate of the second GNSS antenna/receiver 12b.

In addition, knowledge of the position of the first and second GNSS antennas/receivers 12a, 12b relative to one another allows the GNSS processing system 14 to determine an orientation and/or heading of the GNSS antenna/receivers 12a, 12b—or a heading/orientation of the device/vehicle on which the GNSS antenna/receivers 12a, 12b are mounted. For example, in the embodiment shown in FIG. 1b, first GNSS antenna/receiver 12a and second GNSS antenna/receiver 12b are mounted on vehicle 26, separated by a known distance d. Most commonly, the GNSS antenna/receivers 12a, 12b are mounted on opposite sides of the vehicle according to the likely direction of travel (e.g., left and right sides of the vehicle). However, in other embodiments, the number of GNSS antenna/receivers may be increased and the location of the GNSS antenna/receivers relative to one another may be modified, so long as the position of each of the GNSS antenna/receivers relative to one another and to the vehicle 26 is known. In some embodiments, the known position of the first and second GNSS antenna/receivers 12a, 12b relative to one another and to the vehicle 26 can be utilized to determine the orientation (i.e., heading) of the vehicle within a two-dimensional (2D) plane (x-y plane shown in FIG. 1b). In other embodiments, the orientation of the vehicle is determined within a three-dimensional (3D) plane. As described in more detail below, the known distance d between the first and second GNSS antennas/receivers 12a, 12b is utilized to correct erroneous pseudo-ranges generated as a result of reflections. In some embodiments, the distance d is greater than or equal to one meter (m).

An erroneous pseudo-range generated as a result of a reflected GNSS signal may result in GNSS processing system 14 generating an erroneous GNSS position fix estimate with respect to one or more of the GNSS antenna/receivers 12a, 12b and may in addition result in GNSS processing system 14 generating an erroneous heading estimate.

Figure 2:
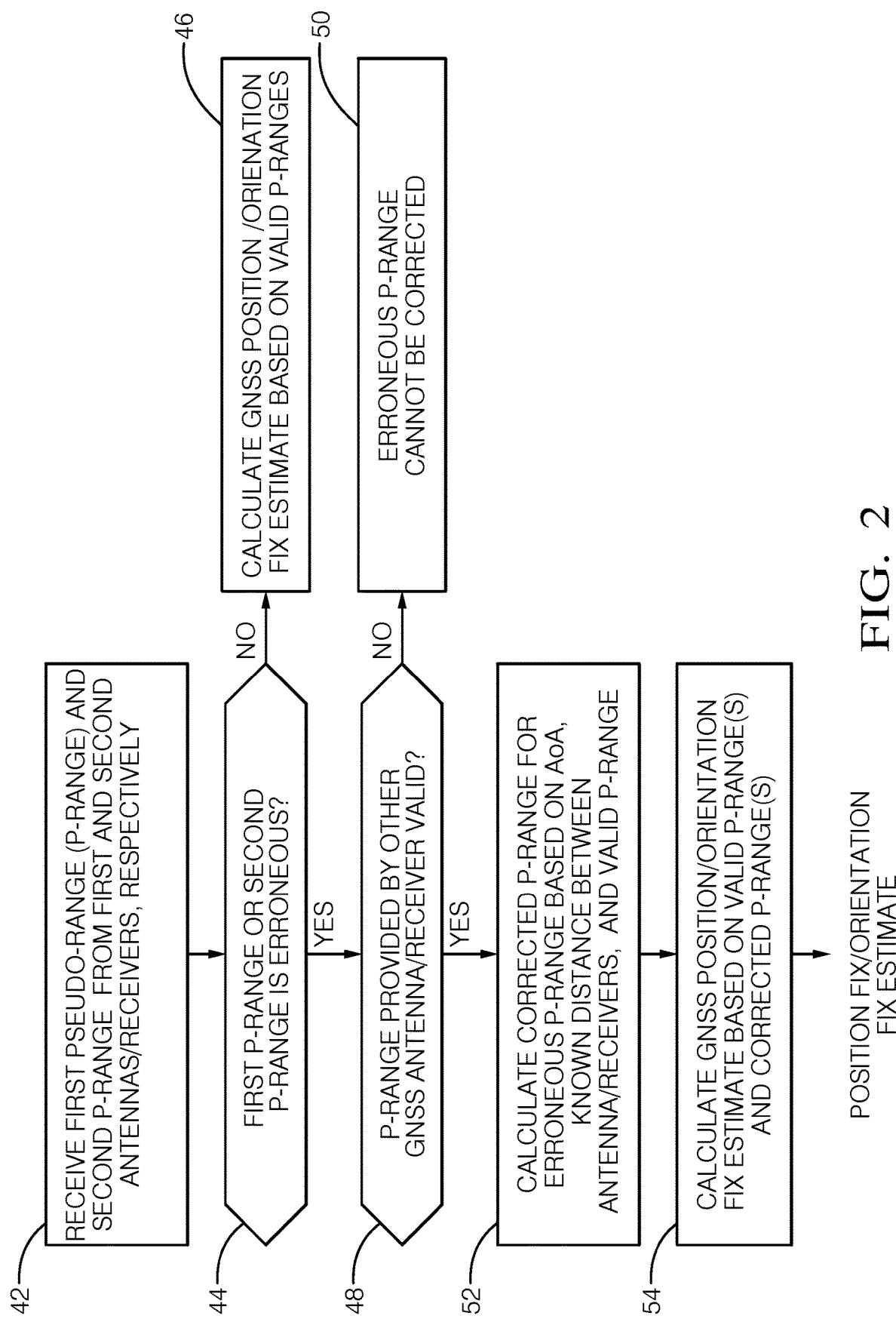
FIG. 2 is a flowchart illustrating steps performed by the processing system to generate a position fix estimate according to some embodiments.

As described in more detail with respect to FIG. 2, in some embodiments GNSS processing system 14 identifies erroneous pseudo-ranges (e.g., first pseudo-range R1, second pseudo-range R2) and utilizes known information—including a valid-pseudo-range received at another GNSS antenna/receiver and the known distance d between the respective GNSS antenna/receivers 12a, 12b—to correct the erroneous pseudo-range. The corrected pseudo-range is then utilized in combination with other pseudo-ranges calculated by the respective GNSS antenna/receiver (e.g., 12a, 12b) to determine the position of each GNSS antenna/receiver 12a, 12b. In addition, in some embodiments the position of first GNSS antenna/receiver 12a and second GNSS antenna/receiver 12b allows the GNSS processing system 14 to determine the orientation of the vehicle to which the GNSS antenna/receivers 12a, 12b are affixed. In some embodiments, the calculated position fix and/or orientation fix estimate is provided as an output. For example, the output may be provided to a visual display located within the vehicle (e.g., vehicle 26, shown in FIG. 1b) or may be provided to user device (e.g., handheld device, smartphone, tablet, etc.).

With respect to FIG. 2, a flowchart is provided that illustrates steps performed by the GNSS processing system 14 according to some embodiments. At step 42, the GNSS processing system 14 receives first pseudo-range R1 and second pseudo-range R2 from first and second GNSS antenna/receivers 12a, 12b, respectively. For the sake of simplicity, the pseudo-ranges are described with respect to the example illustrated in FIG. 1a, in which pseudo-range R1 calculated by GNSS antenna/receiver 12a is valid and pseudo-range R2 calculated by GNSS antenna/receiver 12b is erroneous. While the example described herein is provided with two GNSS signals provided by a single GNSS satellite (as shown in FIG. 1a), it should be understood that this is provided for the sake of simplicity and that GNSS processing system 14 would receive pseudo-ranges provided with respect to a plurality of GNSS satellites and in fact a number of pseudo-ranges from a number of different GNSS satellites is required to generate a GNSS position fix. In addition, in other embodiments more than two GNSS antenna/receivers may be utilized, with each GNSS antenna/receiver providing a pseudo-range with respect to all received GNSS signals.

At step 44, the GNSS processing system 14 determines whether any of the received pseudo-ranges are erroneous. In some embodiments, a pseudo-range is determined to be erroneous based on a comparison of the pseudo-range to an expected pseudo-range. For example, in some embodiments the received pseudo-range is compared to a previously received pseudo-range to determine the change from one epoch (i.e., instances in time) to the next. In some embodiments, pseudo-ranges are calculated at a periodic rate such that each epoch is separated from successive epochs by a constant duration of time. In other embodiments, pseudo-ranges are calculated at aperiodic rates such that time between successive epochs is variable. In both instances, the duration of time between successive epochs may be utilized to determine the expected change in pseudo-ranges from one epoch to the next. A larger than expected change in pseudo-range may be utilized to detect an erroneous pseudo-range value. In some embodiments, the change in pseudo-range from one epoch to the next is compared to the change in pseudo-range detected with respect to the other GNSS antenna. For example, if the first pseudo-range R1 changes by a first amount between time steps, then the second pseudo-range R2 should change by approximately the same amount (assuming both pseudo-ranges were previously valid). A larger than expected change in distance associated with one of the pseudo-ranges as compared with the other pseudo-range may be utilized to detect an erroneous pseudo-range. In some embodiments, the GNSS processing system 14 utilizes IMU data in combination with a previous GNSS position fix to generate a current IMU-based position estimate. That is, a previous GNSS position fix (e.g., from a previous epoch or point in time) is utilized as a starting point, with IMU data being utilized to determine the likely location of the GNSS antenna/receivers 12a, 12b at a current epoch. Based on information regarding the position of the GNSS satellites with respect to the IMU-based position estimate, the received pseudo-ranges can be compared to expected pseudo-ranges. A received pseudo-range that exceeds the expected pseudo-range by more than a threshold amount is identified as potentially erroneous.

If at step 44 neither of the received pseudo-ranges is identified as erroneous, then at step 46 the GNSS position fix estimate is calculated for each GNSS antenna 12a, 12b based on the received pseudo-ranges. If at step 44 one of the pseudo-ranges is identified as erroneous, then at step 48 the pseudo-range provided by the other GNSS antenna/receiver is reviewed to determine whether the pseudo-range is valid. For example, if the pseudo-range R2 provided by the second GNSS antenna/receiver 12b is determined at step 44 to be erroneous, then at step 48 the pseudo-range R1 provided by the first GNSS antenna/receiver 12a is reviewed to determine whether the pseudo-range is valid. It should be noted that the pseudo-range reviewed for validity must correspond with the GNSS signal originating from the same satellite associated with the erroneous pseudo-range.

Determining whether a pseudo-range is valid may rely on one or more of a plurality of methods or checks, utilized alone or in conjunction with one another. For example, in some embodiments the received pseudo-range is compared to a previously received pseudo-range to determine the change from one epoch to the next. The pseudo-range is determined to be valid if the change from one epoch to the next is less than a threshold value. In some embodiments, additional information can be utilized to further refine the determination. For example, in some embodiments the heading of the vehicle determined at the previous epoch based on the calculated GNSS positions of the first and second GNSS antenna/receivers 12a, 12b is utilized to narrow the range of valid pseudo-ranges. In some embodiments, a combination of heading and speed of the vehicle of the vehicle is utilized to narrow the range of valid-pseudo-ranges. In some embodiments, vehicle speed is calculated based on previous GNSS position fix estimates.

In other embodiments, the GNSS processing system 14 utilizes inputs received from additional sources (e.g., wheel tick input, IMU input) to verify the received pseudo-range. For example, in some embodiments the rotation of wheels of the vehicle (referred to as wheel tick input) may be utilized to determine a distance traveled in the time from a previous epoch to the current epoch. In some embodiments, the determined distance creates a ring of expected pseudo-ranges that are compared to the received pseudo-range to determine validity, wherein the received pseudo-range is determined to be valid so long as it is within a threshold distance of the ring of expected pseudo-ranges. In some embodiments, the ring of expected pseudo-ranges calculated based on wheel ticks can be further refined based on heading information calculated at the previous epoch. The combination of distance traveled with previous heading information is utilized to narrow the ring of expected pseudo-ranges to a smaller arc of expected pseudo-ranges, which can be compared to the received pseudo-range to determine validity.

In some embodiments, the GNSS processing system 14 utilizes inputs received from the IMU 15 (shown in FIG. 1a) to calculate IMU-based position estimates. In some embodiments, IMU-based position estimates combine GNSS position fix estimates generated at a previous epoch with IMU data to determine the likely position of the first and second GNSS antenna/receivers 12a, 12b in the current epoch. In some embodiments, IMU-based position estimates are generated at every epoch based on IMU data and GNSS position fix estimates generated in a previous estimate. In some embodiments, IMU-based position estimates are based on IMU data and previously calculated IMU-based position estimates (sometimes referred to as a dead reckoning estimate). In some embodiments, IMU-based position estimates are periodically updated based on GNSS position fix estimates. In some embodiments, the validity of the received pseudo-range is determined based on a comparison with the IMU-based position estimate. Based on information regarding the position of the GNSS satellites with respect to the IMU-based position estimate, the received pseudo-range can be compared to expected pseudo-ranges. A received pseudo-range is considered valid if it is within a threshold value of the expected pseudo-range. In some embodiments, a combination of previous GNSS position fix estimates (including heading/speed information derived therefrom), wheel-tick inputs, and/or IMU-based position estimates are utilized to determine the validity a received pseudo-range.

If at step 48 it is determined that the pseudo-range provided by the other GNSS antenna/receiver is not valid, then at step 50 it is determined that the erroneous pseudo-range detected at step 44 cannot be corrected. In some embodiments, even though it is determined that the erroneous pseudo-range cannot be corrected, the erroneous pseudo-range is discarded rather than being utilized to generate a GNSS position estimate for the GNSS antenna/receiver that provided the erroneous pseudo-range.

If at step 48 it is determined that the pseudo-range provided by the other GNSS antenna/receiver is valid, then at step 52 a corrected pseudo-range is calculated for the erroneous pseudo-range based on the Angle-of-Arrival (AoA) of the received GNSS signal, the known distance d between the first and second GNSS antenna/receivers 12a, 12b, and the valid pseudo-range. In some embodiments, AoA is determined based on an estimated position of the GNSS antenna/receiver that provided a valid pseudo-range and the orientation of the GNSS antenna/receivers. In some embodiments, the estimated position of the GNSS antenna/receiver that provided a valid pseudo-range is a GNSS position fix estimate generated based on the valid pseudo-range as well as presumably, a plurality of other valid pseudo-ranges. In other embodiments, the estimated position of the GNSS antenna/receiver is based on a combination of previous GNSS position estimates and IMU data provided by the IMU 15. In addition to position of the GNSS antenna/receiver, the orientation of the first and second GNSS antenna/receivers 12a, 12b must be known to calculate the AoA. In some embodiments, an orientation estimate is based on a previous GNSS orientation fix estimate generated in a previous epoch in combination with IMU data utilized to extrapolate an IMU based orientation estimate. As discussed in more detail with respect to FIG. 4, below, a number of methods may be utilized to determine the AoA utilized in calculating the corrected pseudo-range.

Figure 3:
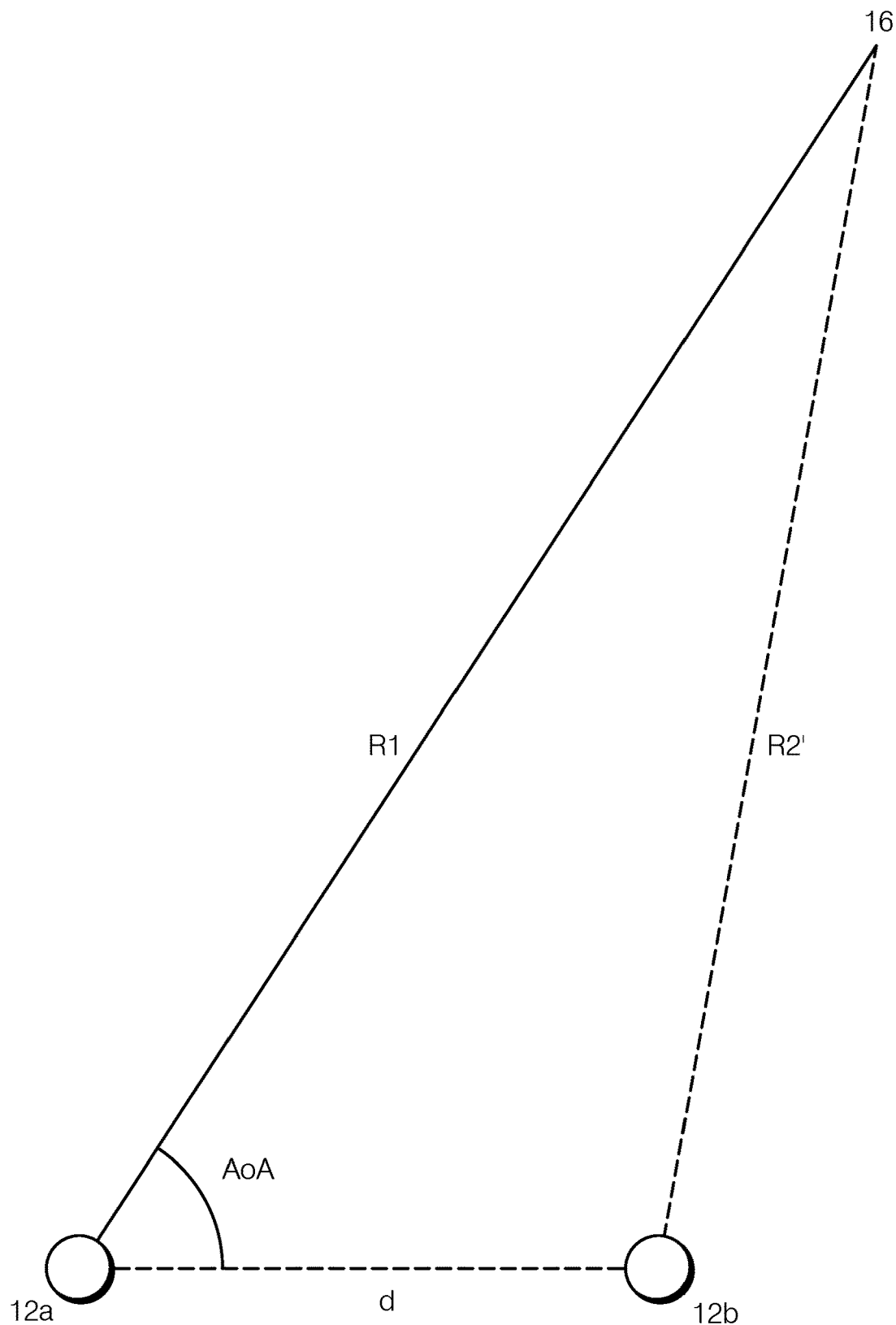
FIG. 3 is a simple diagram illustrating the calculation of the corrected pseudo-range according to some embodiments.

The calculation of the corrected pseudo-range is illustrated visually with respect to the diagram shown in FIG. 3. In this example, the first GNSS satellite 12a receives a LOS GNSS signal and calculated based on the LOS GNSS signal a valid pseudo-range R1 representing the distance between the GNSS satellite 16 and the GNSS antenna/receiver 12a. The distance d between the first GNSS antenna/receiver 12a and the second GNSS antenna/receiver 12b is also known, as is the Angle-of-Arrival (AoA) of the GNSS signal. Based on these known values, the corrected pseudo-range R2'—representing the distance between the second GNSS antenna/receiver 12b and the GNSS satellite 16 is determined. In some embodiments, the corrected pseudo-range R2' is calculated based on the following equation:

$$R2'=\sqrt{R1^2+d^2-2(d*R1*\cos(AoA))} \quad \text{Eq. 1}$$

wherein R1 is the pseudo-range calculated between the first GNSS antenna/receiver 12a and the GNSS satellite 16, d is the known distance between the first and second GNSS antenna/receivers 12a, 12b, and AoA is the angle formed between a line drawn from the first GNSS antenna/receiver 12a and the GNSS satellite 16 and a line drawn between the first and second GNSS antenna/receivers 12a, 12b.

At step 54, a GNSS position fix is calculated for each GNSS antenna/receiver based on valid pseudo-ranges and corrected pseudo-ranges. For example, the position of GNSS antenna/receiver 12b is determined based on a plurality of received pseudo-ranges and corrected pseudo-ranges (e.g., corrected pseudo-range R2' shown in FIG. 3). In some embodiments, in addition to GNSS position fix estimates generated for both the first GNSS antenna/receiver 12a and the second GNSS antenna/receiver 12b, a GNSS orientation estimate is generated based on the first and second GNSS position fix estimates. The GNSS position fix and/or orientation estimate is provided as an output. For example, the GNSS position fix and/or orientation estimate may be displayed within the vehicle and/or on a user device.

Figure 4:
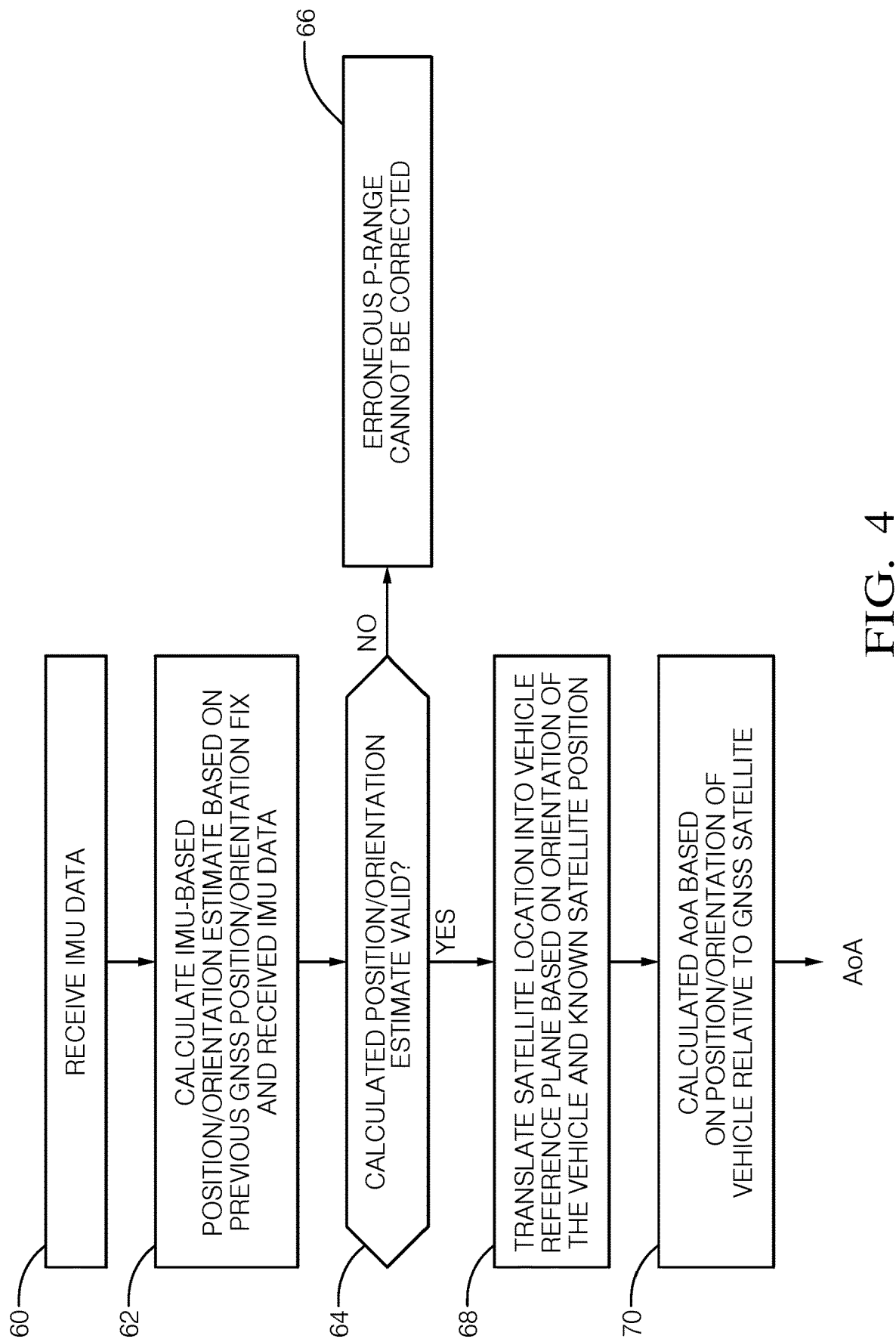
FIG. 4 is a flowchart illustrating additional steps performed by the processing system to calculate Angle-of-Arrival (AoA) according to some embodiments.

Referring now to FIG. 4, a method of utilizing IMU data to generate IMU-based position and/or orientation estimates is provided. In the embodiment shown in FIG. 4, the IMU-based position/orientation estimate is utilized to calculate the AoA utilized at step 52 (shown in FIG. 2) to calculate the corrected pseudo-range. As discussed above with respect to FIGS. 1a and 2, above, in some embodiments an IMU is utilized to provide IMU data to the GNSS processing system 14, which is utilized to generate IMU-based position/orientation estimates. In some embodiments, the IMU data is only utilized to generate IMU-based orientation estimates utilized to determine the AoA as shown in FIG. 3. In other embodiments, the IMU data is utilized to generate IMU-based position and orientation estimates. The IMU-based position estimate may be utilized to verify a position estimate and/or may be utilized on conjunction with the IMU-based orientation to determine the AoA.

At step 60 the GNSS processing system 14 receives inertial measurement unit (IMU) data. As described above, IMU data is generated by an inertial measurement unit (IMU) 15 (as shown in FIG. 1a) and may include one or more accelerometers, gyroscopes, and/or magnetometers. The IMU data describes the forces applied to the IMU 15 during operation. The IMU 15 is located on the vehicle on which the first and second GNSS antenna/receivers so that the forces experienced by the GNSS antenna/receivers resulting in a change of position and/or orientation are recorded by the IMU 15.

At step 62 the GNSS processing system 14 calculates an IMU-based position/orientation estimate based on a previous position/orientation fix and the received IMU data. In some embodiments, the previous position/orientation fix is the GNSS position/orientation fix generated at a previous epoch (e.g., time-step) based on received GNSS signals and calculated position of the first and second GNSS antenna/receivers 12a, 12b relative to one another. The IMU data provides information regarding the movement of the GNSS antennas/receivers 12a, 12b in the time since the last GNSS position/orientation fix. In some embodiments, the updated position/orientation estimate based on received IMU data is referred to as a dead-reckoning position/orientation estimate. In other embodiments, the IMU data is only utilized to generate IMU-based orientation estimates. In this embodiment, the position estimate utilized in combination with the orientation estimate to generate the AoA may be based on the valid pseudo-range received by the GNSS antenna/receiver (in combination with other valid pseudo-range values).

In some embodiments, at step 64 a determination is made whether the IMU-based position/orientation estimate generated at step 62 is valid. For example, in some embodiments the IMU-based position/orientation estimate may be compared to knowledge of the surrounding area (e.g., 3D map) to determine the validity of the IMU-based position/orientation estimate. For example, the IMU-based position/orientation estimate indicate that the vehicle is located in a body of water, the IMU-based position/orientation estimate is likely not valid. Likewise, if the IMU-based position/orientation estimate indicates that the vehicle is located within a building structure (e.g., office building), the IMU-based position/orientation estimate is likely not valid. In some embodiments, the IMU-based position/orientation estimate is compared to valid pseudo-ranges received by one or more of the GNSS antenna/receivers and utilized to verify that the IMU-based position/orientation estimate is valid.

If the IMU-based position/orientation estimate is identified as invalid at step 64, then the erroneous pseudo-range cannot be corrected, and the process ends at step 66. As discussed above with respect to step 50, even if the erroneous pseudo-range cannot be corrected, in some embodiments it remains beneficial to remove the erroneous pseudo-range from calculations of GNSS position fix/orientation estimates.

If the IMU-based position/orientation estimate is identified as valid at step 64, then at step 68 the location of the GNSS satellite is translated into the reference plane of the vehicle based on the IMU-based position orientation estimate of the vehicle and the known location of the GNSS satellite. In some embodiments, the AoA is defined as the angle of the incoming valid GNSS signal and a line drawn between the first GNSS antenna/receiver 12a and the second GNSS antenna/receiver 12b. To determine the AoA, the position of the valid GNSS antenna/receiver, the position of the GNSS satellite 16, and the orientation of the vehicle and therefore the orientation of the second GNSS antenna/receiver relative to the first GNSS antenna/receiver, must be known. In some embodiments, it may be assumed that the vehicle is always approximately level, and the orientation of the first and second GNSS antenna/receivers may be approximated to one or a plurality of discrete or quantized orientations (e.g., east, west, north, and south). For example, assuming the example shown in FIG. 1b illustrates an orientation in a first direction (e.g., North), then a determination of the vehicle oriented in the opposite direction (e.g., South) would result in the second GNSS antenna/receiver 12b being placed on the opposite side of first GNSS antenna/receiver 12a with a corresponding change to the AoA from less than 90° to greater than 90°.

At step 70, the AoA is calculated based on the position/orientation of the first and second GNSS antenna/receivers 12a, 12b relative to the GNSS satellite 16. As described above with respect to FIG. 4, the AoA is utilized—in combination with the distance d between the first and second GNSS antenna/receivers and valid pseudo-range R1—the corrected pseudo-range R2'.

Figure 5:
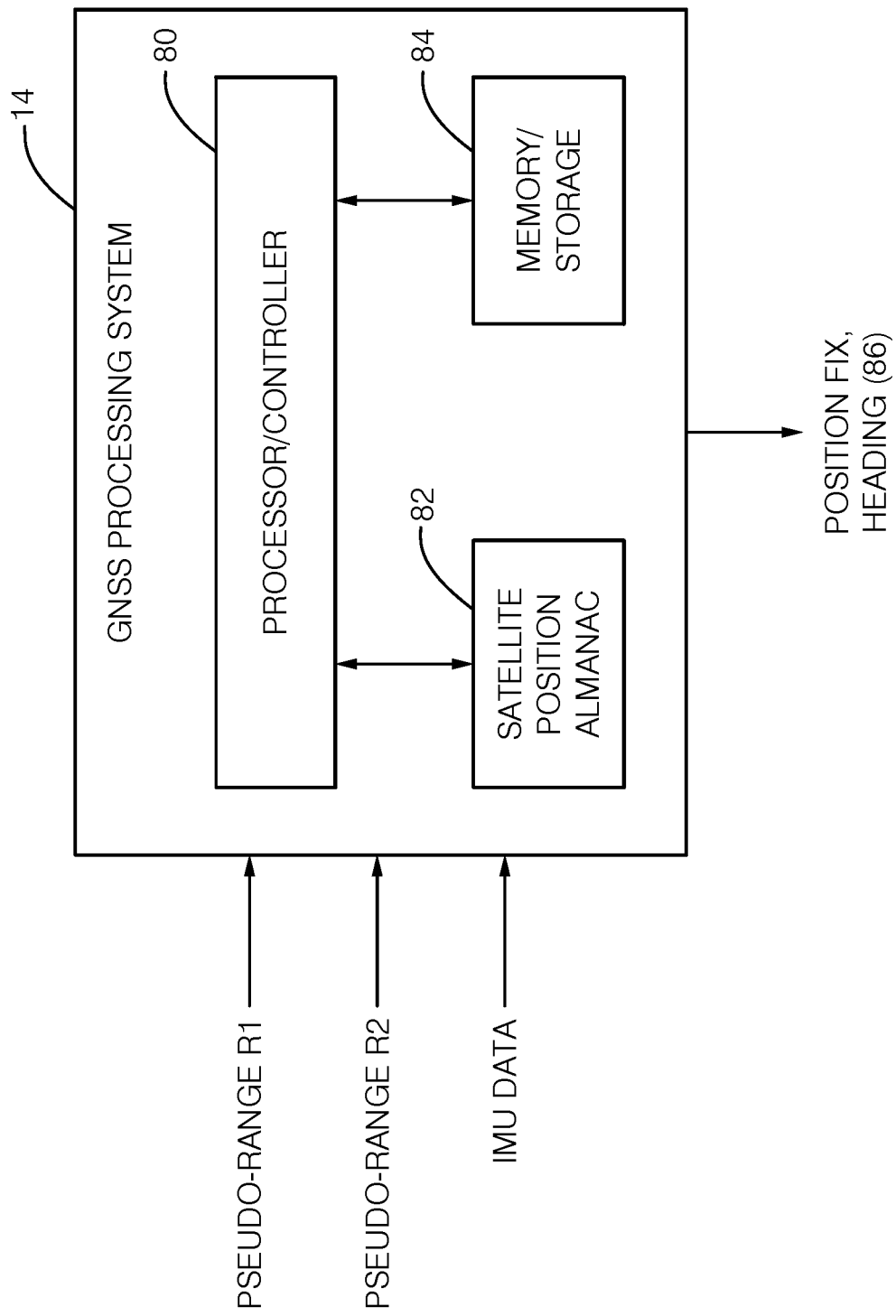
FIG. 5 is a block diagram of the processing system utilized by the dual antenna position estimate system according to some embodiments.

FIG. 5 is a block diagram of the GNSS processing system 14 according to some embodiments. GNSS processing system 14 is configured to receive inputs from the GNSS antenna/receivers. In some embodiments, GNSS processing system 14 is also configured to receive IMU data from an IMU 15. The inputs provided by the GNSS antenna/receivers may include pseudo-ranges calculated by the GNSS antenna/receivers 12a, 12b, or may include raw GNSS data received by the GNSS antenna/receivers but unprocessed. In the latter embodiment, GNSS processing system 14 calculates pseudo-ranges based on the raw GNSS data provided by the GNSS antenna/receivers 12a, 12b. In response to the received pseudo-range inputs and/or IMU data, GNSS processing system 14 generates a GNSS position/orientation fix estimate 86. In some embodiments, the position/orientation fix estimate 86 also includes a time associated with position/orientation fix estimate 86. In some embodiments, the GNSS position/orientation fix estimate 86 is displayed to a user within the vehicle 26 (e.g., as shown in FIG. 1b). In other embodiments, the GNSS position/orientation fix estimate 86 may be provided as an output to a variety of devices and/or systems for display and/or use.

In some embodiments, GNSS processing system 14 is located in close proximity to the first and second GNSS antenna/receivers 12a, 12b (e.g., onboard a vehicle on which GNSS antenna/receivers 12a, 12b are mounted, as shown in FIG. 1b). In other embodiments, GNSS processing system 14 may be located remotely from the first and second GNSS antennas/receivers 12a, 12b. For example, in some embodiments pseudo-ranges (or raw GNSS data) are communicated via wireless communication to the remotely located GNSS processing system 14. Position fix and/or orientation estimate generated by the GNSS processing system 14 are utilized remotely and/or wirelessly communicated to the vehicle and/or user device for display.

In some embodiments, GNSS processing system 14 includes processor/controller 80, satellite location almanac/database 82, and memory/storage 84 as shown in FIG. 5. Processor/controller 80 executes computer-readable instructions stored on memory/storage 84 to implement the steps and functions described herein (for example, as shown in FIGS. 2 and 4) to identify and correct erroneous pseudo-ranges to allow the GNSS processing system 14 to generate GNSS position/orientation fix estimates.

Processor/controller 80 accesses satellite position almanac 82 to gather information regarding the location of the GNSS satellites. In some embodiments, GNSS processing system 14 downloads spatially relevant satellite position almanac data to satellite position almanac 82. In some embodiments, calculation of GNSS position/orientation fixes are calculated only after all spatially relevant satellite position almanac data has been downloaded.

In this way, this disclosure provides a dual GNSS antenna/receiver system, wherein a valid pseudo-range detected at one of the GNSS antenna/receivers can be utilized in combination with a known distance between the respective GNSS antenna/receivers to correct an erroneous pseudo-range detected at the other GNSS antenna/receiver.

Discussion of Possible Embodiments

The following are non-exclusive descriptions of possible embodiments of the present invention.

According to one aspect, a dual-antenna positioning system includes a first global navigation satellite system (GNSS) antenna/receiver, a second GNSS antenna/receiver, and a GNSS processor system. The first GNSS antenna/receiver is located at a first position and calculates a first pseudo-range based on a received GNSS signal. The second GNSS antenna/receiver is located at a second position a known distance from the first GNSS antenna/receiver, wherein the second GNSS antenna/receiver calculates a second pseudo-range based on a received GNSS signal. The GNSS processor system configured to receive the first pseudo-range and the second pseudo-range, wherein in response to the GNSS processor system identifying one of the first and second pseudo-ranges as erroneous and one of the first and second pseudo-ranges as valid, the GNSS processing system calculates a corrected pseudo-range and utilizes the corrected pseudo-range and the valid pseudo-range to determine GNSS position fix estimates for the first GNSS antenna/receiver and the second GNSS antenna/receiver.

The system of the preceding paragraph can optionally include, additionally and/or alternatively any one or more of the following features, configurations and/or additional components.

For example . . . the GNSS processing system may calculate the corrected pseudo-range based on valid pseudo-range, the known distance between the first GNSS antenna/receiver and the second GNSS antenna/receiver, and an angle of arrival (AoA) of the received GNSS signal at the GNSS antenna/receiver that generated the valid pseudo-range.

The GNSS processing system may calculate the AoA of the received GNSS signal based on a current position/orientation estimate of the dual-antenna positioning system and GNSS satellite position.

The GNSS processing system may calculate the current position/orientation estimate based on a previous GNSS position/orientation fix estimate and known speed and direction of the dual-antenna positioning system.

The dual-antenna positioning system may further include an inertial measurement unit (IMU), wherein the GNSS processing system utilizes IMU data received from the IMU in combination with previous GNSS position/orientation fix estimates to generate the current position/orientation estimate.

According to another aspect, a method of determining a global navigation satellite system (GNSS) position fix estimate includes receiving a first pseudo-range from a first GNSS antenna/receiver and receiving a second pseudo-range from a second GNSS antenna/receiver located a known distance from the first GNSS antenna/receiver. The method further includes determining that the first pseudo-range is erroneous and determining that the second pseudo-range is valid. A corrected first pseudo-range is calculated based on the second pseudo-range, the known distance between the first GNSS antenna/receiver and the second GNSS antenna/receiver, and angle-of-arrival (AoA) of a GNSS signal received at the second GNSS antenna/receiver. A GNSS position fix estimate is calculated for the first GNSS antenna/receiver based, at least in part, on the corrected first pseudo-range.

The method of the preceding paragraph can optionally include, additionally and/or alternatively any, one or more of the following features, configurations and/or additional components.

For example, the step of determining that the first pseudo-range is erroneous may include comparing the first pseudo-range to an expected pseudo-range, wherein the first pseudo-range is determined to be erroneous if it exceeds the expected pseudo-range by a threshold amount.

The expected pseudo-range may be calculated based on an IMU-based position estimate generated based on a previous GNSS position fix estimate and inertial measurement unit (IMU) data provided by an IMU.

The step of determining that the second pseudo-range is valid may include comparing the second pseudo-range to an expected pseudo-range, wherein the second pseudo-range is determined to be valid if it is within a threshold of the expected pseudo-range.

The AoA of the GNSS signal may be determined based on a known position of a GNSS satellite that originated the GNSS signal and a position/orientation estimate of the second antenna/receiver.

The position/orientation estimate of the second antenna/receiver may be based on a previous GNSS position/orientation fix estimate and inertial measurement unit (IMU) data.

The step of calculating the corrected first pseudo-range may be based on the following equation:

$$R2' = \sqrt{R1^2 + d^2 - 2(d*R1*\cos(AoA))}$$

wherein R1 is the second pseudo-range, d is the distance between the first GNSS antenna/receiver and the second GNSS antenna/receiver, AoA is the angle-of-arrival of the GNSS signal received at the second GNSS antenna/receiver and R2' is the corrected pseudo-range.

According to another aspect, a global-navigation satellite system (GNSS) is configured to receive GNSS data from a first GNSS antenna/receiver and a second GNSS antenna/receiver and to provide in response a GNSS position/orientation estimate for the first GNSS antenna/receiver and the second GNSS antenna/receiver. The GNSS includes a processor and a computer readable medium that stores instructions that, when executed by the processor, perform a method to a calculate the GNSS position fix estimate. The method includes identifying a first pseudo-range associated with the first GNSS antenna/receiver as erroneous and identifying a second pseudo-range associated with the second GNSS antenna/receiver as valid. The method further includes calculating a corrected first pseudo-range based on the second pseudo-range, the known distance between the first GNSS antenna/receiver and the second GNSS antenna/receiver and angle-of-arrival (AoA) of the GNSS signal received at the second GNSS antenna/receiver. A GNSS position fix estimate is calculated for the first GNSS antenna/receiver based, at least in part, on the corrected first pseudo-range.

The system of the preceding paragraph can optionally include, additionally and/or alternatively any one or more of the following features, configurations and/or additional components.

For example, the step of identifying that the first pseudo-range is erroneous may include comparing the first pseudo-range to an expected pseudo-range, wherein the first pseudo-range is determined to be erroneous if it exceeds the expected pseudo-range by a threshold amount.

The expected pseudo-range may be calculated based on an IMU-based position estimate generated based on a previous GNSS position fix estimate and inertial measurement unit (IMU) data provided by an IMU.

The AoA of the GNSS signal may be determined based on a known position of a GNSS satellite that originated the GNSS signal and a position/orientation estimate of the second antenna/receiver.

The position/orientation estimate of the second antenna/receiver may be based on a previous GNSS position/orientation fix estimate and inertial measurement unit (IMU) data received by the GNSS from an IMU.

The corrected first pseudo-range may be calculated based on the following equation:

$$R2' = \sqrt{R1^2 + d^2 - 2(d*R1*\cos(AoA))}$$

wherein R1 is the second pseudo-range, d is the distance between the first GNSS antenna/receiver and the second GNSS antenna/receiver, AoA is the angle-of-arrival of the GNSS signal received at the second GNSS antenna/receiver and R2' is the corrected pseudo-range.

The invention claimed is:

1. A dual-antenna positioning system comprising:
   a first global navigation satellite system (GNSS) antenna/receiver located at a first position, wherein the first GNSS antenna/receiver calculates a first pseudo-range based on a received GNSS signal;
   a second GNSS antenna/receiver located at a second position a known distance from the first GNSS antenna/receiver, wherein the second GNSS antenna/receiver calculates a second pseudo-range based on a received GNSS signal; and
   a GNSS processor system configured to receive the first pseudo-range and the second pseudo-range, wherein in response to the processor system identifying one of the first and second pseudo-ranges as erroneous and one of the first and second pseudo-ranges as valid, the processing system calculates a corrected pseudo-range and utilizes the corrected pseudo-range and the valid pseudo-range to determine GNSS position fix estimates for the first GNSS antenna/receiver and the second GNSS antenna/receiver, wherein the GNSS processing system calculates the corrected pseudo-range based on valid pseudo-range, the known distance between the first GNSS antenna/receiver and the second GNSS antenna/receiver, and an angle of arrival (AoA) of the received GNSS signal at the GNSS antenna/receiver that generated the valid pseudo-range.

2. The dual-antenna positioning system of claim 1, wherein the GNSS processing system calculates AoA of the received GNSS signal based on a current position/orientation estimate of the dual-antenna positioning system and GNSS satellite position.

3. The dual-antenna positioning system of claim 2, wherein the current position/orientation estimate is based on a previous GNSS position/orientation fix estimate and known speed and direction of the dual-antenna positioning system.

4. The dual-antenna positioning system of claim 2, further including:
   an inertial measurement unit (IMU), wherein the GNSS processing system utilizes IMU data received from the IMU in combination with previous GNSS position/orientation fix estimates to generate the current position/orientation estimate.

5. A method of determining a global navigation satellite system (GNSS) position fix estimate, the method comprising:
   receiving a first pseudo-range from a first GNSS antenna/receiver;
   receiving a second pseudo-range from a second GNSS antenna/receiver located a known distance from the first GNSS antenna/receiver;
   determining that the first pseudo-range is erroneous;
   determining that the second pseudo-range is valid;
   calculating a corrected first pseudo-range based on the second pseudo-range, the known distance between the first GNSS antenna/receiver and the second GNSS antenna/receiver, and angle-of-arrival (AoA) of a GNSS signal received at the second GNSS antenna/receiver; and
   calculating a GNSS position fix estimate for the first GNSS antenna/receiver based, at least in part, on the corrected first pseudo-range.

6. The method of claim 5, wherein determining that the first pseudo-range is erroneous includes comparing the first pseudo-range to an expected pseudo-range, wherein the first pseudo-range is determined to be erroneous if it exceeds the expected pseudo-range by a threshold amount.

7. The method of claim 6, wherein the expected pseudo-range is calculated based on an IMU-based position estimate generated based on a previous GNSS position fix estimate and inertial measurement unit (IMU) data provided by an IMU.

8. The method of claim 6, wherein the expected pseudo-range is calculated based on a wheel tick input utilized to determine a distance traveled from a previous GNSS position fix estimate.

9. The method of claim 5, wherein determining that the second pseudo-range is valid includes comparing the second pseudo-range to an expected pseudo-range, wherein the second pseudo-range is determined to be valid if it is within a threshold of the expected pseudo-range.

10. The method of claim 5, wherein the AoA of the GNSS signal is determined based on a known position of a GNSS satellite that originated the GNSS signal and a position/orientation estimate of the second antenna/receiver.

11. The method of claim 10, wherein the position/orientation estimate of the second antenna/receiver is based on a previous GNSS position/orientation fix estimate and inertial measurement unit (IMU) data.

12. The method of claim 5, wherein the calculating the corrected first pseudo-range is based on the following equation:

$$R2' = \sqrt{R1^2 + d^2 - 2(d * R1 * \cos(\text{AoA}))}$$

wherein R1 is the second pseudo-range, d is the distance between the first GNSS antenna/receiver and the second GNSS antenna/receiver, AoA is the angle-of-arrival of the GNSS signal received at the second GNSS antenna/receiver and R2' is the corrected pseudo-range.

13. A global-navigation satellite system (GNSS) configured to receive GNSS data from a first GNSS antenna/receiver and a second GNSS antenna/receiver and to provide in response a GNSS position/orientation estimate for the first GNSS antenna/receiver and the second GNSS antenna/receiver, the GNSS system including a processor and a computer readable medium that stores instructions that, when executed by the processor, perform the following method:
   identifying a first pseudo-range associated with the first GNSS antenna/receiver as erroneous;
   identifying a second pseudo-range associated with the second GNSS antenna/receiver as valid;
   calculating a corrected first pseudo-range based on the second pseudo-range, the known distance between the first GNSS antenna/receiver and the second GNSS antenna/receiver and angle-of-arrival (AoA) of the GNSS signal received at the second GNSS antenna/receiver; and
   calculating a GNSS position fix estimate for the first GNSS antenna/receiver based, at least in part, on the corrected first pseudo-range.

14. The GNSS of claim 13, wherein identifying that the first pseudo-range is erroneous includes comparing the first pseudo-range to an expected pseudo-range, wherein the first pseudo-range is determined to be erroneous if it differs from the expected pseudo-range by a threshold amount.

15. The GNSS of claim 14, wherein the expected pseudo-range is calculated based on an IMU-based position estimate generated based on a previous GNSS position fix estimate and inertial measurement unit (IMU) data provided by an IMU.

16. The GNSS of claim 14, wherein the expected pseudo-range is calculated based on a wheel tick-based position estimate generated based on a previous GNSS position fix estimate and a wheel tick input defining a distance traveled by the vehicle since the previous GNSS position fix estimate.

17. The GNSS of claim 13, wherein the AoA of the GNSS signal is determined based on a known position of a GNSS satellite that originated the GNSS signal and a position/orientation estimate of the second antenna/receiver.

18. The GNSS of claim 17, wherein the position/orientation estimate of the second antenna/receiver is based on a previous GNSS position/orientation fix estimate and inertial measurement unit (IMU) data received by the GNSS from an IMU.

19. The GNSS of claim 13, wherein the calculating the corrected first pseudo-range is based on the following equation:

$$R2' = \sqrt{R1^2 + d^2 - 2(d*R1*\cos(AoA))}$$

wherein R1 is the second pseudo-range, d is the distance between the first GNSS antenna/receiver and the second GNSS antenna/receiver, AoA is the angle-of-arrival of the GNSS signal received at the second GNSS antenna/receiver and R2' is the corrected pseudo-range.

* * * * *